F. F. ROSENBERGER & J. T. HENDRICKS, Jr.
FEED DISTRIBUTER FOR FOWLS.
APPLICATION FILED APR. 11, 1912.
1,031,736.
Patented July 9, 1912.
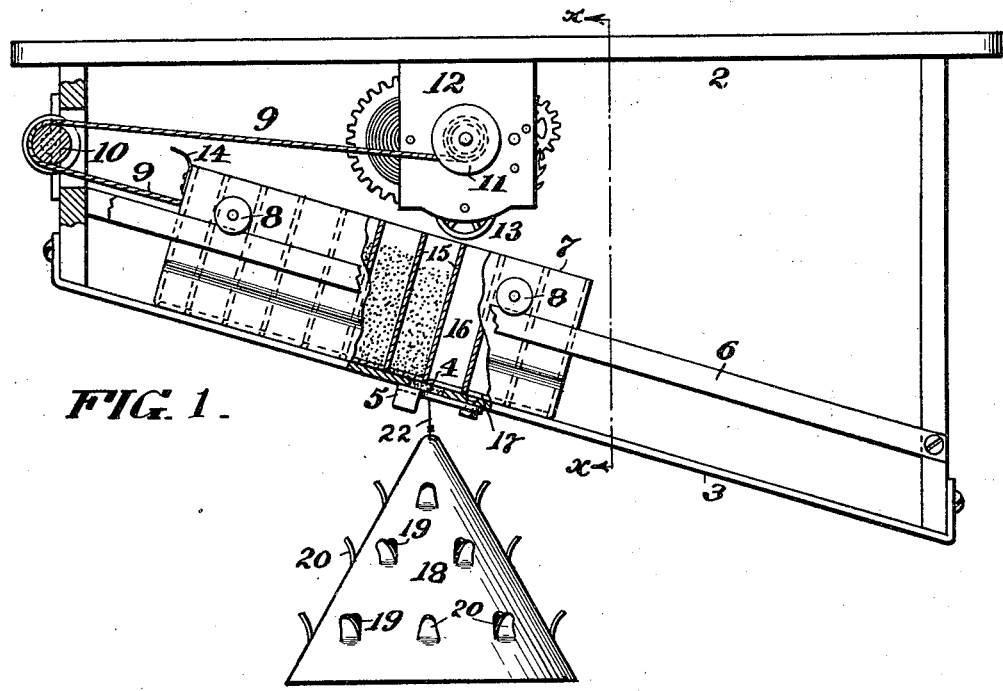
FIG. 1.
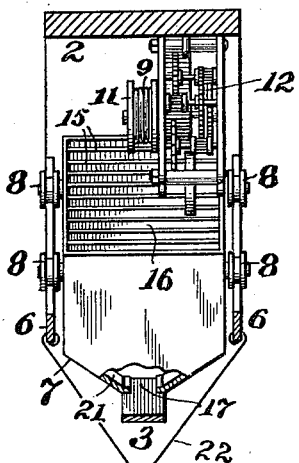
FIG. 2.
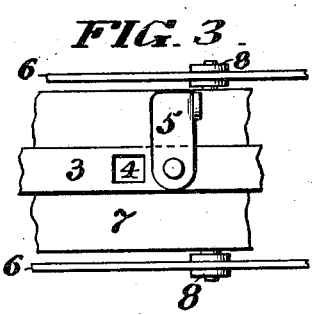
FIG. 3.

UNITED STATES PATENT OFFICE.

FRANK F. ROSENBERGER AND JOHN T. HENDRICKS, JR., OF PERKASIE, PENNSYLVANIA.

FEED-DISTRIBUTER FOR FOWLS.

1,031,736.  Specification of Letters Patent.  Patented July 9, 1912.

Application filed April 11, 1912. Serial No. 690,072.

*To all whom it may concern:*

Be it known that we, FRANK F. ROSENBERGER and JOHN T. HENDRICKS, Jr., citizens of the United States, and residents of Perkasie, county of Bucks, and State of Pennsylvania, have invented an Improvement in Feed-Distributers for Fowls, of which the following is a specification.

Our invention has reference to means for automatically delivering feed to fowls, and consists of certain improvements which are fully set forth in the following specification and shown in the accompanying drawings which form a part thereof.

Our invention has for its object the provision of automatic devices which will deliver definite quantities of feed to the fowl at regular or stated intervals, whereby the feed required may be more uniformly distributed to the fowl over given periods of time and may be automatically accomplished.

Our invention consists of an inclined guide-way over which a feed box is caused to travel by gravity, said box being divided into a number of compartments for containing different portions of the feed and said compartments being open at the bottom, combined with an inclined plate which normally closes the bottom of the feed compartments of the feed box but which is provided at one point in its length with an aperture through which the feed may be discharged from the compartments in succession as they come above the said aperture, a clock work, and means controlled by the clock work for governing the movement of the feed box down the guide-way and over the discharge opening of the inclined plate.

Our invention further consists in the above mechanism when provided with a distributing device arranged below the discharge aperture in the inclined plate for spreading the feed as it falls, so that it shall cover a larger area of the ground than would otherwise occur.

Our invention also comprehends details of construction which, together with the features above specified, will be better understood by reference to the drawings, in which:—

Figure 1 is a side elevation of a chicken feed delivering apparatus, with part in section, and embodying our improvements; Fig. 2 is a cross sectional elevation of the same on line $x$—$x$; and Fig. 3 is an inverted plan view showing the discharge opening through which the feed is distributed.

2 is the main frame of the apparatus and may be made in any suitable manner desired. Ordinarily, it consists of a horizontal top board and two vertical end boards. Secured to this frame at the bottom is an inclined plate 3, which has a discharge opening 4 and an adjustable valve 5 which may be turned into position to close the said opening when desired. In Fig. 1, it is shown as in closed position, and in Fig. 3 it is shown as turned to the open position. On each side of the main frame and above the plate 3 are arranged the guide rails 6, these being inclined parallel to the bottom plate 3.

7 is a feed box, and is provided on each side with supporting rollers 8, which run upon the tracks or rails 6, and the bottom of this box closely fits to the inclined plate 3, but not so heavily as to induce objectionable friction therewith. It is desirable that the incline of the rails and the plate 3 shall be just sufficient to cause the feed box 7 to travel down the said rails and over the inclined plate 3 by the action of gravity. We, however, do not restrict ourselves to the exact incline which may be employed.

To the upper end of the feed box 7 is secured a cord 9 which is guided about a pulley 10 on the main frame and extended back to a winding drum 11 on a clock movement 12, said movement having the usual escapement 13. As this clock movement operates, the cord 9 is unwound from the winding drum 11, and thereby permits the feed box to travel slowly down the inclined tracks 6 and over the opening 4 in the plate 3. When the feed box 7 has descended to its lowermost position, a spring finger 14 thereon is arranged to engage the escapement 13 of the clock movement 12 to stop its action. By reason of this construction, the clock movement will not be permitted to run except when it is desired to deliver feed, and this will accomplish two results, namely, to prevent needless wearing out of the clock movement, and secondly, to prevent the cord 9 being rewound upon the winding drum 11 in the opposite direction and locking the feed box 7 in an elevated position. We desire to utilize the action of gravity to obviate the necessity of requiring a strong clock movement, but it is evident that if desired, the cord 9 may be so wound upon the drum 11 that the feed box with its load will be pulled upward over the discharge opening 4 instead of being allowed to descend, said change of operation being one of adjustment only.

The feed box 7 is preferably of uniform cross section with a plurality of transverse divisions 15 therein to form a plurality of feed compartments 16 which may be of the same width or of varying widths, as desired, according to the amount of feed it is desired to distribute at any particular time of the day. The bottom of the feed box is formed with inclined sides 21, so as to facilitate the discharge of the feed through the bottom opening 17 of the said compartments 16, whenever the same come over the opening 4 in the inclined plate 3.

To prevent the discharge of the feed through the opening 4 taking place on one spot upon the ground, we prefer to provide a distributer below the said opening, upon which the feed will strike, and by which it will be distributed over a larger area. A suitable form of said distributer is indicated in Fig. 1, and consists of a metal cone 18 having a plurality of openings 19, over its surfaces and with the metal stamped from said openings bent up to form abutments 20 against which the feed may strike and be projected through the openings, the remaining portion of the feed sliding over the outer surfaces of the cone and being distributed at various distances upon the ground. This cone distributer 18 may be suspended by wires 22 hooked to the side rails 6, or it may be suspended in any suitable manner. Any other form of a distributer may be employed in place of that shown, or if desired, the distributer may be dispensed with altogether.

My improved apparatus may be hung or attached to any suitable support found convenient in the barn-yard. The movable feed box 7 may be of any size desired and divided into compartments of regular or different sizes, according to the amount of feed which it is desired to deliver at any particular period of the day. In the particular illustration, ten compartments are shown, and if the controlling devices were so proportioned as to bring one compartment over the opening 4 at each hour, the feed in said box would provide, substantially an hourly distribution for ten hours. The time and quantity of feed may therefore be governed to suit the requirements, and it is also evident that where less quantity of feed is needed at one time than another, the compartments 16 may be filled to a greater or less height, all of which will be readily understood by those employing apparatus of this kind. By employing the tracks 6 and wheels 8, the frictional resistance to the sliding of the box 7 will be reduced to a minimum, as the plate 3 above which the bottom of the box slides will not be required to press against the box with any material force, but just close enough to prevent the passage of the feed between the bottom of the box and the said plate. In the particular illustration, we have shown the bottom as approximately in contact with the plate, as this would prevent the passage of even the finest corn meal which might be used as feed, but with coarser materials it would not be necessary to have the bottom of the box in actual contact with the plate.

While we have illustrated the motor for controlling the downward movement of the feed box of the form commonly employed in clocks with the drum 11 attached to the hour arbor, it is to be understood that any suitable form of motor may be employed in lieu of that shown, and we do not limit ourselves in this respect.

In the operation of the device, the valve 5 is turned to open the aperture 4, and as the feed box is permitted to travel downward, the open bottoms 17 of the compartments will successively pass over this opening 4 to insure the delivery of the contents of the said compartments in succession. It will be understood, however, that as the division plates 15 pass over the openings 4, the entire contents of the compartment thus brought into communication with said opening will be discharged before the full extent of the open bottom thereof has passed above the opening 4. For example, if the valve 5 in Fig. 1, were opened, with the box 7 in the position shown, all of the feed from the compartment just brought into communication with the opening 4 would be discharged. This, however, is a matter of no importance, because the timing of the discharges will be just the same as if the compartments were fully brought over the openings 4 before the discharge took place.

We have shown our invention in a simple and inexpensive form, and while we prefer the construction as illustrated, we do not restrict ourselves to the details, as these may be modified without departing from the spirit of the invention.

Having now described our invention, what we claim as new and desire to secure by Letters Patent, is:—

1. In a feed distributer for fowl, the combination of a frame having an inclined guide-way and an inclined plate having a discharge aperture, a feed box divided into compartments by transverse divisions said compartments opening through the bottom of the box said feed box guided on the inclined guide-way and over the inclined plate so as to discharge the contents of its compartments successively through the discharge aperture in the inclined plate, and mechanical means for causing the feed box to be moved gradually down the inclined guide-way and over the aperture in the inclined plate.

2. In a feed distributer for fowl, the combination of a frame having an inclined guide-way and an inclined plate having a discharge aperture, a feed box divided into compartments by transverse divisions said compartments opening through the bottom of the box said feed box guided on the inclined guide-way and over the inclined plate so as to discharge the contents of its compartments successively through the discharge aperture in the inclined plate, mechanical means for causing the feed box to be moved gradually down the inclined guide-way and over the aperture in the inclined plate said means consisting of a cord extending from the box and a spring actuated motor, and a controlling device having an escapement for regulating the descent of the feed box.

3. In a feed distributer for fowl, the combination of a frame having an inclined guide-way and an inclined plate having a discharge aperture, a feed box divided into compartments by transverse divisions said compartments opening through the bottom of the box said feed box guided on the inclined guide-way and over the inclined plate so as to discharge the contents of its compartments successively through the discharge aperture in the inclined plate, mechanical means for causing the feed box to be moved gradually down the inclined guide-way and over the aperture in the inclined plate, and means on the feed box for controlling the mechanical means to arrest the feeding of the feed box when its last compartment has passed over the opening in the inclined plate.

4. In a feed distributer for fowl, the combination of a frame having an inclined guide-way and an inclined plate having a discharge aperture, a feed box divided into compartments by transverse divisions said compartments opening through the bottom of the box said feed box guided on the inclined guide-way and over the inclined plate so as to discharge the contents of its compartments successively through the discharge aperture in the inclined plate, mechanical means for causing the feed box to be moved gradually down the inclined guide-way and over the aperture in the inclined plate, and a valve device arranged on the bottom of the inclined plate for controlling the discharge of feed through the said opening.

5. In a feed distributer for fowl, the combination of a frame having an inclined guide-way and an inclined plate having a discharge aperture, a feed box divided into compartments by transverse divisions said compartments opening through the bottom of the box said feed box guided on the inclined guide-way and over the inclined plate so as to discharge the contents of its compartments successively through the discharge aperture in the inclined plate, mechanical means for causing the feed box to be moved gradually down the inclined guide-way and over the aperture in the inclined plate, and a distributing device supported below the opening in the inclined plate for distributing the feed over a larger area than would take place from the opening direct.

6. In a feed distributer for fowl, the combination of a main frame having two inclined side rails and a lower flat inclined plate parallel to the tracks and having a discharge aperture through the same, with a feed box having wheels running upon the rails and an open bottom in close relation to the inclined plate whereby the latter forms a floor to the said feed box and said feed box further divided into a plurality of compartments by transverse divisions which are brought successively into alinement with the discharge aperture in the inclined plate, and mechanical devices for regulating the descent of the feed box whereby the feed from the plurality of compartments may be successively discharged.

7. In a feed distributer for fowl, the combination of a main frame having two inclined side rails and a lower flat inclined plate parallel to the tracks and having a discharge aperture through the same, with a feed box having wheels running upon the rails and an open bottom in close relation to the inclined plate whereby the latter forms a floor to the said feed box and said feed box further divided into a plurality of compartments by transverse divisions which are brought successively into alinement with the discharge aperture in the inclined plate, and mechanical devices for regulating the descent of the feed box whereby the feed from the plurality of compartments may be successively discharged said mechanical devices consisting of a clock movement having a drum, a cord from the drum extending to the feed box, and means operated by the feed box for stopping the operation of the clock movement when the feed box has moved to its lowermost position.

8. In a feed distributer for fowl, the combination of a main frame having two inclined side rails and a lower flat inclined plate parallel to the tracks and having a discharge aperture through the same, with a feed box having wheels running upon the rails and an open bottom in close relation to the inclined plate whereby the latter forms a floor to the said feed box and said feed box further divided into a plurality of compartments by transverse divisions which are brought successively into alinement with the discharge aperture in the inclined plate, mechanical devices for regulating the descent of the feed box whereby the feed from the plurality of compartments may be successively discharged, and a distributer arranged below the aperture in the inclined plate for distributing the feed discharged through said aperture.

9. In a feed distributer for fowl, the combination of a main frame having two inclined side rails and a lower flat inclined plate parallel to the tracks and having a discharge aperture through the same, with a feed box having wheels running upon the rails and an open bottom in close relation to the inclined plate whereby the latter forms a floor to the said feed box and said feed box further divided into a plurality of compartments by transverse divisions which are brought successively into alinement with the discharge aperture in the inclined plate, mechanical devices for regulating the descent of the feed box whereby the feed from the plurality of compartments may be successively discharged, and a hinged valve secured to the under-side of the inclined plate to open or close the discharge opening therein.

In testimony of which invention, we hereunto set our hands.

FRANK F. ROSENBERGER.
JOHN T. HENDRICKS, Jr.

Witnesses:
J. O. STEELEY,
SAMUEL F. STOVER.

---

Copies of this patent may be obtained for five cents each, by addressing the "Commissioner of Patents, Washington, D. C."